United States Patent [19]

Osthues et al.

[11] Patent Number: 5,117,858
[45] Date of Patent: Jun. 2, 1992

[54] TOP ENTRY BALL VALVES WITH CAM ADJUSTABLE SEATS

[75] Inventors: Robert H. Osthues, Holden; Brian J. Caprera, Worchester, both of Mass.

[73] Assignee: Worcester Controls Corporation, Marlborough, Mass.

[21] Appl. No.: 767,391

[22] Filed: Sep. 30, 1991

[51] Int. Cl.$^5$ .................. F16K 25/00; F16K 43/00
[52] U.S. Cl. .................. 137/315; 251/159; 251/161; 251/163; 251/170; 251/315; 251/316
[58] Field of Search .................. 137/315, 316; 251/159, 251/160, 161, 162, 163, 170, 174, 315, 316

[56] References Cited

U.S. PATENT DOCUMENTS

| | | | |
|---|---|---|---|
| 1,738,450 | 12/1929 | Ryan et al. | 251/159 |
| 3,171,429 | 3/1965 | Sturmer et al. | 251/159 |
| 3,209,778 | 10/1965 | Flohr | 251/170 |
| 3,771,545 | 11/1973 | Allen | 137/315 |
| 3,830,693 | 8/1974 | Beser et al. | 251/162 |
| 4,175,577 | 11/1979 | Kacal et al. | 137/315 |
| 4,262,691 | 4/1981 | Kacal | 137/315 |
| 4,388,945 | 6/1983 | Johnson et al. | 137/315 |
| 4,390,039 | 6/1983 | Johnson et al. | 137/315 |
| 4,424,825 | 1/1984 | Hanson | 251/170 |
| 4,727,901 | 3/1988 | Horvei | 251/161 |

Primary Examiner—George L. Walton
Attorney, Agent, or Firm—Pollock, VandeSande and Priddy

[57] ABSTRACT

A top entry ball valve comprises a housing having an interior cavity sufficiently large to receive a conventional ball and conventional seat rings through an opening in the housing. After the ball/seat package has been inserted into the cavity, a cam arrangement is used to axially load the seat rings. The cam arrangement comprises a pair of circular cams, each having an undulating annular surface, which are disposed in the housing cavity adjacent one of the seat rings with the respective undulating annular surfaces of the cams being in closely adjacent facing relation to one another. After assembly of the valve, one of the circular cams is rotated relative to the other cam to vary the rotational positions of the undulating annular surfaces relative to one another thereby to vary the axial positions of the circular cams relative to one another and relative to the ball and seat rings.

14 Claims, 2 Drawing Sheets

TOP ENTRY BALL VALVES WITH CAM ADJUSTABLE SEATS

BACKGROUND OF THE INVENTION

The present invention relates to ball valves of the top entry type, and is more particularly concerned with a top entry ball valve that is adapted to receive a conventional valve ball and associated seat rings of conventional design through an opening in the valve housing without regard to the orientation of the ball.

Most ball valve designs feature body joints which are subject to piping stress, and this can cause leakage. If such joints are welded, the valve is usually rendered unserviceable, and cannot be repaired, and the welding process itself may cause damage to the seat and seals within the valve housing. Top entry valves avoid these particular problems since they have a bonnet joint that is not subject to piping stress, and top entry valves can be disassembled for weld-in installation thereby protecting the seats and seals from damage due to the heat of welding.

Top entry ball valves of current design have assembly problems, however. The seats should be preloaded against the ball to provide true sealing capability. The required preload causes the assembly problem. Various arrangements have been suggested to facilitate assembly of top entry valves, each of which, however, gives rise to still other problems.

In one approach suggested heretofore the valve employs tapered arrangements to wedge the seats against the ball. Such valves, when used under varying service conditions, e.g., high temperature followed by low temperature, with repeated thermal cycling, are subject to "thermal jacking" caused by differential expansion, i.e., every time there is a significant reduction in the temperature of the valve, the ball/seat package shrinks and falls further into the valve body. When the valve is subsequently heated again, and the ball/seat package expands, the valve operating torque can become very high.

An alternative approach has been to modify the configuration of the ball that is used in the top entry valve so that the ball is foreshortened across the port hole in the ball, i.e., a portion of the outer diameter of the ball is flattened. When the ball is placed in open position between a pair of annular seat rings, the "stack height" of the ball/seat package is less than the height of the package with the ball in its closed position, the difference in these stack heights being sufficient to allow the open ball stack to be inserted into the valve body. Designs of this type, however, require flexible seats, thereby limiting the service conditions under which the ball valve can be used, and each cycle flexes the seats causing additional wear on all seat sealing surfaces. Moreover, the ball is loose when it is in its open position, which is undesirable, and particles of dirty media can be trapped behind the seats, causing leakage and failure.

In an effort to avoid some of the foregoing problems, it has been suggested that the valve be provided with a mechanism of some type that can be used to axially load the seats onto the ball after the ball/seat package has been inserted into the valve body, for example by adjusting the axial positions of the seats relative to one another and relative to the valve ball. Externally adjustable designs have been suggested employing, for example, adjustment mechanisms that penetrate the body wall and are manipulated from the exterior of the valve body, but such penetrations are undesirable since they provide potential leakage paths. Internally adjustable designs have been suggested which feature jacking screws or similar devices, but devices of this type are subject to corrosion, stress cracking, or gumming and sedimentation (deposits) which impede operation of the device used to axially load the seats.

Spring loaded designs have also been suggested, but springs under stress are much more prone to corrosion and failure than similar material used in an unstressed condition in a similar environment. Stress corrosion is a very common failing, and, in addition, the loading provided by springs may vary significantly under particular service conditions since, for example, springs relax at high temperatures.

The present invention is intended to obviate the foregoing problem.

SUMMARY OF THE INVENTION

The present invention provides a top entry ball valve design that allows direct use of well known and proven seat technology, without any changes being required in the ball or seat dimensions or loading. The design loads the seats to a known, controlled and constant stack height, and achieves and maintains the same constant preload that can be achieved in ball valves of the end entry, split body or 3-piece body types. The seat loading is uniform, in contrast to other designs suggested heretofore which load the seats unevenly, and the loading mechanism employed is large and is provided with generous clearances that prevent jamming from media deposits.

A valve ball and an associated pair of seat rings, each of conventional configuration, are disposed within a tubular cage for insertion as a package through an opening provided in the bonnet surface of a top entry valve body, and into an interior cavity in the body. After the ball/seat package is inserted into the cavity, the seats and associated seatback seals are loaded by a camming mechanism comprising two mating cams that, when rotated relative to one another, create a necessary, evenly distributed compression in the seats and seal. The tubular cage, in addition to locating the ball and seats in the cavity of the valve body, ensures positive controlled axial loading of the seat package. The valve can be provided with multiple body stem options, has no body joints, is fully bi-directional, and can accept soft Teflon or rubber seats, hard plastic seats, metal seats, and characterized metal control seats.

The camming mechanism used to axially load the seats and seatback seals comprises a pair of circular cams each of which has an undulating annular surface. The two circular cams are disposed in the cavity of the valve body adjacent one end of the cage in coaxial relation to the cage and seat rings, with the respective undulating annular surfaces of the two circular cams being in closely adjacent facing relation to one another. At least one of the circular cams is rotatable relative to the other of the cams to vary the rotational positions of the undulating annular surfaces relative to one another, thereby to vary the axial positions of the circular cams relative to one another and relative to the ball and seat rings. The undulating annular surfaces on the two cams preferably have complementary configurations, and nest within one another in an initial relative rotational position of the circular cams. At least one of the circular cams include a notch that can be engaged, e.g., by a screwdriver, inserted through the bonnet opening of the valve body to rotate that cam relative to the other cam.

Ordinarily the forces exerted by the loaded seats and seatback seals are sufficient to maintain the relative positions of the circular cams used to achieve the pre-load. If it is anticipated that the valve is going to be used under severe service conditions, however, e.g., where the valve will be subjected to widely varying temperature conditions that may result in significant differential expansion between the seats, other mechanisms in the body, and the body itself, provision can be made to lock the two circular cams in position relative to one another to maintain the relative rotational positions of the cams used to achieve the desired axial loading. The circular cams can be provided with peripheral slots that are brought into alignment with one another when one or both of the cams has been rotated into the relative cam positions used to achieve the necessary loading, and a key can then be inserted into the aligned slots through the bonnet opening of the valve body to lock the cams against any subsequent relative rotation. The key can be an integral projection of the bonnet component.

BRIEF DESCRIPTION OF THE DRAWINGS

The foregoing objects, advantages, construction and operation of the present invention will become more readily apparent from the following description and accompanying drawings wherein.

DESCRIPTION OF THE PREFERRED EMBODIMENTS

Figure 2:
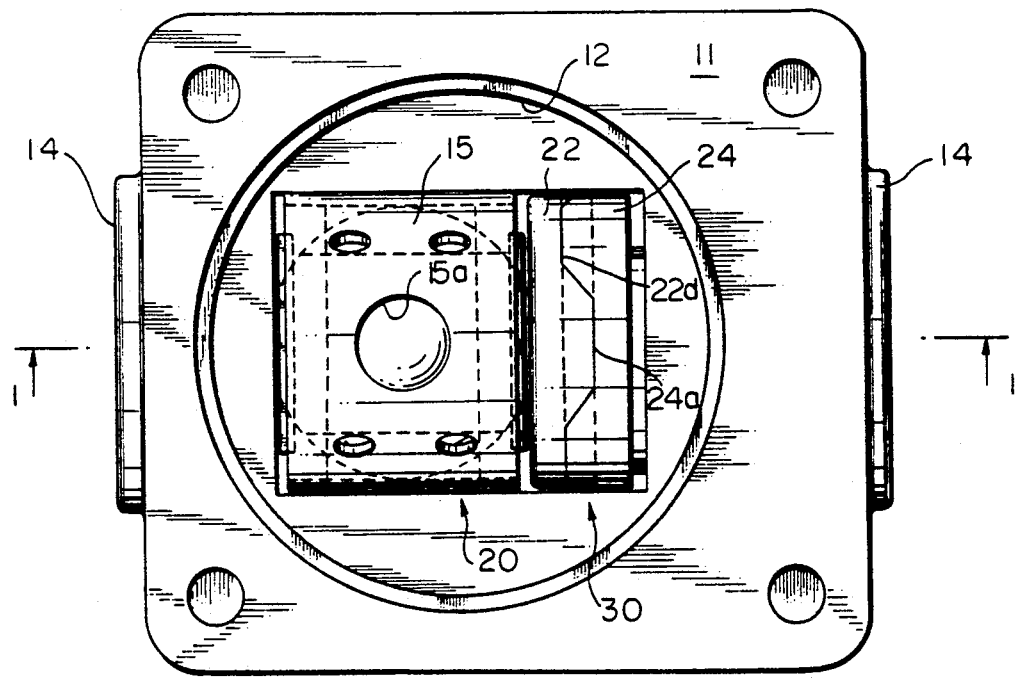
FIG. 2 is a plan view of the valve shown in FIG. 1.
Figure 3:
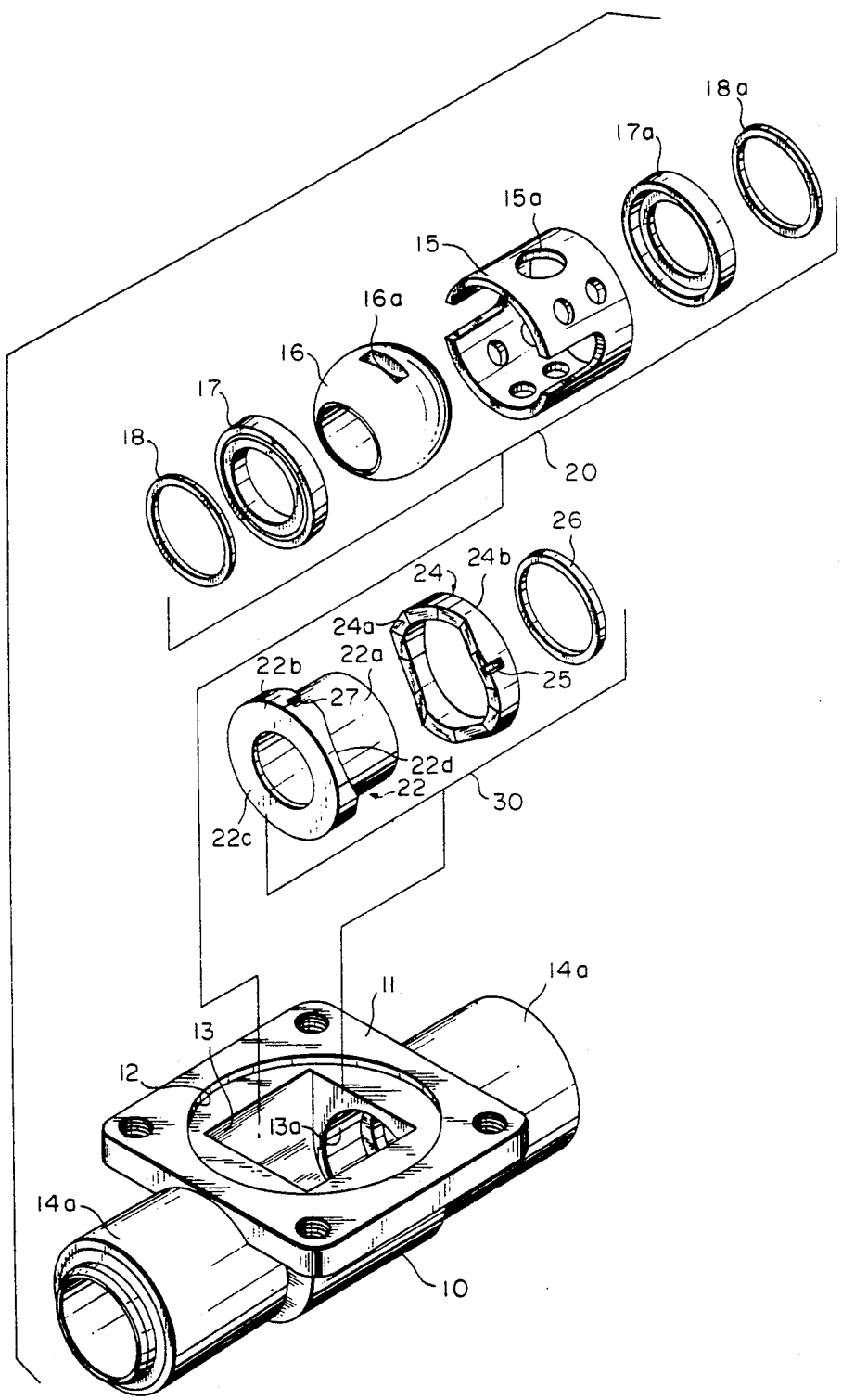
FIG. 3 is an exploded perspective view of a top entry valve constructed in accordance with the present invention, utilizing the same interior components that are employed in the embodiment shown in FIGS. 1 and 2, but having a slightly modified valve body.

The top entry valve of the present invention comprises a unitary valve body 10 having a surface 11 upon which a bonnet (not shown) can be mounted. The bonnet surface 11 is provided with a comparatively large opening 12 into a cavity 13 located within the valve body. Cavity 13 communicates with aligned pipe ends 14 at opposing ends of the body to define an axial flow passage extending through the valve body 11. The pipe ends 14a in FIG. 3 are somewhat longer than the pipe ends 14 in FIGS. 1 and 2.

The cavity 13 is sized and shaped to receive a ball/seat package 20 consisting of a perforated tubular cage 15 containing a conventional valve ball 16 that can be rotated within the cage by means of a stem (not shown) that passes through the cage 15 via a cage opening 15a into engagement with a stem slot 16a in ball 16. The ball is rotatable between a pair of conventional annular seat rings 17, 17a located within cage 15 adjacent opposing ends of said cage. Seat rings 17, 17a are preferably fabricated of lubricant-impregnated metallic material, e.g., each can take the form of a graphite-filled sintered metal seat of the type described in Smith et al U.S. Pat. No. 4,531,273, or a polymer-impregnated sintered metal seat of the type described in Gonzalez U.S. Pat. No. 4,377,892. The back surfaces of the seats 17, 17a are provided with annular grooves that receive flexible seatback seals 18 and 18a. Although not illustrated in the drawings, the seats 17 and 17a protrude outwardly of the opposing ends of cage 15 prior to being axially loaded, i.e., when the ball/seat package 20 is initially inserted into cavity 13 during assembly of the top entry valve.

Prior to insertion of the ball/seat package 20, a camming mechanism 30 is inserted into cavity 13 for use in axially loading the seats 17, 17a and seatback seals 18, 18a in package 20. Camming mechanism 30 comprises a carrier cam 22 having a tubular sleeve portion 22a that is integral with an enlarged annular flange 22b at one end thereof. Flange 22b has a substantially flat annular surface 22c extending transverse to the axis of cam 22 and adapted to be located adjacent one end of ball/seat package 20, and said flange 22b includes a further annular surface 22d spaced rearwardly of annular surface 22c and having an undulating configuration. Sleeve portion 22a is inserted into a tubular recess 13a within the valve body 10 to properly locate camming mechanism 30 within the valve body.

The camming mechanism further includes a ring-shaped collar cam 24 that is mounted for rotation on the tubular sleeve portion 22a of carrier cam 22. Collar cam 24 has an annular surface 24a of undulating configuration disposed in facing relation to undulating annular surface 22d of carrier cam 22. The undulating surfaces 22d and 24a of cams 22 and 24 are complementary in configuration whereby, when the camming mechanism 30 is initially inserted into cavity 13, said undulating annular surfaces nest one within the other as shown for example in FIG. 2. The outer edge of collar cam 24 includes a notch 25 that can be engaged by a tool, e.g., a screwdriver inserted into cavity 13 via opening 12, to rotate collar cam 24 on the tubular sleeve portion 22a of carrier cam 22, so as to displace the undulating surfaces 22d, 24a from their nested positions. When cam 24 is rotated to a position wherein "high" portions of its undulating surface 24a are disposed adjacent "high" portions of undulating surface 22d on carrier cam 22, the axial distance between annular surface 22b of cam 22 and a rear annular surface 24b of collar cam 24 increases to axially load seats 17, 17a and seatback seals 18, 18a in package 20, and to also axially load a further ring shaped seal 26 that is disposed between the annular surface 24b of cam 24 and an adjacent interior surface of valve body 11.

Figure 1:
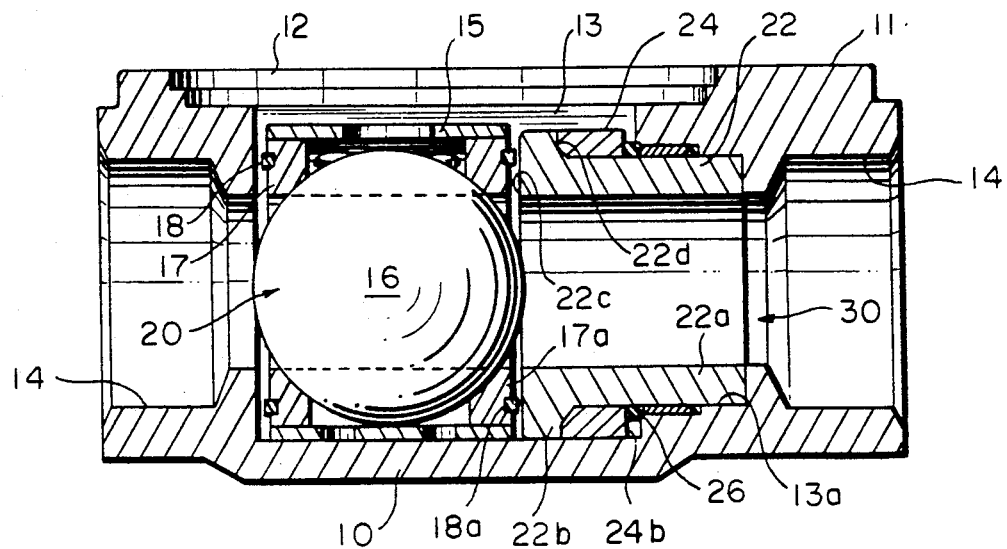
FIG. 1 is a cross section of a top entry valve constructed in accordance with the present invention, taken on line 1—1 of FIG. 2.

As shown in FIG. 1, cavity 13 of valve body 11 is sufficiently large to receive ball/seat package 20 and camming mechanism 30, with space being provided between seat 17 and the adjacent interior surface of body 11, and between seat 17a and the adjacent annular surface 22c of the camming mechanism when the undulating surfaces of cams 22 and 24 are in their nested condition. The units 20, 30 can therefore be readily inserted into cavity 13 without regard to the orientation of ball 16 at the time of valve assembly, even though ball 16 and seats 17, 17a are of conventional configuration.

At the time of assembly, the cage 15 is utilized to properly locate the ball 16 and seats 17, 17a relative to one another within cavity 13. Following insertion of the ball/seat package 20, the relative rotational positions of cams 22 and 24 are changed, e.g., in the manner described above, to effect a growth in the axial dimension between cam surfaces 22c and 24b, causing seatback seal 18 to be compressed between seat 17 and the adjacent interior surface of valve body 11, compression of seatback seal 18a between seat 17a and surface 22c of carrier cam 22, compression of seal 26 between cam surface 24b and the adjacent interior surface of valve body 11, and axial loading of seats 17 and 17a relative to ball 16. The compression, i.e., loading of the seats and seals is evenly distributed. The magnitude of the loading is determined by the axial length of the cage 15, i.e., inasmuch as the outside diameter of flange 22b on cam 22 is greater than the inside diameter of cage 15, annular surface 22c of cam 22 comes into engagement with the adjacent end of cage 15 to provide a positive stop for the cam action. The remainder of the axial movement until the cam plateau is reached, provides needed squeeze to the seal 26.

Although it is possible to rotate each of cams 22 and 24, or either of said cams, to effect a rotational displacement of the undulating cam surfaces 22d and 24a relative to one another, in the preferred embodiment of the invention the carrier cam 22 is not displaced rotationally and it is only the rotational position of collar cam 24 that is changed. When the cams have been fully shifted rotationally relative to one another to achieve the desired seat and seal loading, the forces exerted by the axially loaded seats and seals are normally sufficient to prevent further change in the relative rotational positions of cams 22 and 24. Considerable relative rotation of the cams is needed to achieve loss of loading. However under severe service conditions it may be necessary to provide means for positively locking the cams against relative rotation after the desired axial loading has been achieved. One simple way of accomplishing this is to provide flange 22b of carrier cam 22 with an edge notch 27 that comes into alignment with notch 25 of collar cam 24 at a particular rotational position of the two cams relative to one another, and to insert a metallic key into the aligned notches 25, 27 to prevent rotational displacement of the two cams relative to one another.

While we have thus described a preferred embodiment of the present invention, variations will be apparent to those skilled in the art from the foregoing description. It must therefore be emphasized that the description is intended to be illustrative only and not limitative of the present invention, and all such variations and modifications as are in accord with the principles described are meant to fall within the scope of the appended claims.

Having thus described our invention, we claim:

1. In a ball valve of the type comprising a valve body having an interior cavity located between and communicating with a pair of fluid flow channels to define an axial flow passage extending through said housing, a ball located in said cavity, said ball having an axially directed bore extending therethrough, said ball being mounted for rotation about an axis of rotation transverse to said flow passage whereby its said bore may be selectively aligned with or disposed transverse to the axial flow passage in said housing to open and close said valve respectively thereby to control the flow of fluid through said axial flow passage, and a pair of annular seat rings disposed in surrounding relation to said axial flow passage adjacent the upstream and downstream sides of said ball respectively, the improvement comprising cam means in said cavity for shifting the axial position of one of said seat rings relative to the axial position of the other of said seat rings to vary the loading of said seat rings against said ball, said cam means including first and second ring shaped cams disposed adjacent one another in coaxial relation to one another and to said seat rings, said first ring shaped cam having a first substantially flat annular surface disposed closely adjacent to a back surface of said one of said seat rings and also having a second undulating annular surface axially spaced from said back surface of said one of said seat rings and from said first annular surface, said second ring shaped cam having an undulating annular surface disposed adjacent and in facing relation to said undulating surface of said first ring shaped cam, and means on at least one of said ring shaped cams for varying the relative rotational position of said ring shaped cams relative to one another to vary the positions of said undulating annular surfaces relative to one another thereby to vary the axial positions of said first and second ring shaped cams relative to one another and relative to said seat rings.

2. The ball valve of claim 1 wherein said valve is a top entry valve having a bonnet surface on said valve body that defines an opening in communication with said cavity through which said ball, said seat rings and said cam means can be inserted into said cavity, said means for varying the relative rotational positions of said ring shaped cams being accessible through said opening in said housing.

3. The ball valve of claim 2 wherein said undulating annular surfaces of said first and second cams are complementary in configuration and nest one within the other in an initial relative rotational position of said ring shaped cams.

4. The ball valve of claim 3 wherein said means for varying the relative rotational positions of said cams comprises a notch in at least one of said cams adapted to be engaged by a tool that is removably inserted into said cavity through said opening in said valve body.

5. The ball valve of claim 2 including means for locking said first and second ring shaped cams against rotation relative to one another after the relative rotational positions of said cams have been varied to a desired extent.

6. The ball valve of claim 2 wherein said ball and said seat rings are located within a tubular cage in said cavity, said seat rings being respectively positioned adjacent opposing ends of said tubular cage in coaxial relation to said tubular cage, said first ring shaped cam having an outer diameter greater than the inside diameter of said tubular cage, and said substantially flat annular surface of said first ring shaped cam being disposed adjacent one end of said tubular cage in facing relation to the back surface of the one of said seat rings that is positioned adjacent said one end of said tubular cage.

7. The ball valve of claim 2 wherein said first ring shaped cam includes a tubular sleeve portion coaxial with said annular surfaces of said first cam and having an outside diameter less than the outside diameter of said annular surfaces, said second ring shaped cam being mounted for rotation on said tubular sleeve portion of said first cam.

8. The ball valve of claim 7 wherein said tubular sleeve portion of said first cam is inserted into a tubular recess within said valve body thereby to fix the position of said cam means in said cavity.

9. The ball valve of claim 2 wherein each of said seat rings is fabricated of metal, each of said seat rings having a back surface remote from said ball, a first ring shaped seal being provided between said substantially flat annular surface of said first ring shaped cam and the facing back surface of said one of said seat rings, and a second ring shaped seal being provided between an interior surface of said valve body and the back surface of the other of said pair of seat rings.

10. The ball valve of claim 9 including a further ring shaped seal between said second ring shaped cam and an interior surface of said valve body.

11. In a ball valve of the type comprising a top entry valve body having an interior cavity containing a rotatable valve ball disposed between a pair of annular seat rings, cam means being provided for varying the axial loading of said seat rings on said ball, the improvement wherein said ball and said seat rings are of conventional configuration, said cavity being sufficiently large to receive said ball and seat rings through a top entry opening in said housing without regard to the orientation of said valve ball, and said cam means comprising a pair of circular cams each of which has an undulating annular surface, said pair of circular cams being disposed in said cavity adjacent one of said seat rings in coaxial relation to one another and to both of said seat rings with the respective undulating annular surfaces of said cams being in closely adjacent facing relation to one another, at least one of said circular cams being rotatable relative to the other of said cams to vary the rotational positions of said undulating annular surfaces relative to one another thereby to vary the axial positions of said circular cams relative to one another and relative to said ball and seat rings.

12. The ball valve of claim 11 wherein said undulating annular surfaces have complementary configurations and nest within one another in an initial relative rotational position of said circular cams.

13. The ball valve of claim 12 wherein one of said circular cams includes a coaxial tubular sleeve portion extending away from the undulating annular surface of said cam, the other of said circular cams being an annular cam disposed for rotation on said tubular sleeve portion of said one of said cams.

14. The ball valve of claim 13 wherein said tubular sleeve portion is located within a complementarily shaped and sized recess within said valve body thereby to fix the position of said cam means relative to said ball and seat rings.

* * * * *